Aug. 12, 1952 N. J. WATSON ET AL 2,606,511
METHOD AND APPARATUS FOR DIP-COATING COOKIES
Filed Sept. 11, 1947 10 Sheets-Sheet 1

INVENTORS
Nathan J. Watson and
William R. Steingraber
By:- Albert G. McCaleb
Att'y

METHOD AND APPARATUS FOR DIP-COATING COOKIES

Filed Sept. 11, 1947 10 Sheets-Sheet 2

INVENTORS
Nathan J. Watson and
William R. Steingraber
By:- Robt. G. McCord
Att'y.

METHOD AND APPARATUS FOR DIP-COATING COOKIES

Filed Sept. 11, 1947 10 Sheets-Sheet 3

INVENTORS
Nathan J. Watson and
William R. Steingraber
By: Albert D. McCaleb
atty.

METHOD AND APPARATUS FOR DIP-COATING COOKIES

Filed Sept. 11, 1947 10 Sheets-Sheet 4

INVENTORS
Nathan J. Watson and
William R. Steingraber
By- Albert D. McCaleb
atty.

METHOD AND APPARATUS FOR DIP-COATING COOKIES

INVENTORS
Nathan J. Watson and
William R. Steingraber
By:- Albert G. McCaleb
att'y.

METHOD AND APPARATUS FOR DIP-COATING COOKIES

Filed Sept. 11, 1947 10 Sheets-Sheet 6

INVENTORS
Nathan J. Watson and
Willim R. Steingraber
By:- Albert G. McCaleb
Att'y.

INVENTORS

Nathan J. Watson and
William R. Steingraber
By:- Albert G. McCaleb
Att'y.

Aug. 12, 1952 N. J. WATSON ET AL 2,606,511

METHOD AND APPARATUS FOR DIP-COATING COOKIES

Filed Sept. 11, 1947 10 Sheets-Sheet 8

INVENTORS
Nathan J. Watson and
William R. Steingraber
By:- Albert G. McCaleb
Att'y.

INVENTORS
Nathan J. Watson and
William R. Steingraber
By: Albert G. McCaleb
Att'y.

INVENTORS
Nathan J. Watson and
William R. Steingraber
By Albert G. McCaleb
Atty.

Patented Aug. 12, 1952 2,606,511

UNITED STATES PATENT OFFICE 2,606,511

METHOD AND APPARATUS FOR DIP-COATING COOKIES

Nathan J. Watson and William R. Steingraber, Sioux City, Iowa, assignors to Johnson Biscuit Company, Sioux City, Iowa, a corporation of Iowa Application September 11, 1947, Serial No. 773,450

21 Claims. (Cl. 107—54)

This invention relates to a method and apparatus for dip-coating cookies and the like, and has particular application to a continuous process wherein practically all operations are mechanically accomplished to produce merchandise of uniform high quality with a minimum of material waste.

One of the general objects of our invention is to provide an efficient, effective and economical method and apparatus for applying one or more layers of icing, marshmallow and/or chocolate or the like to the outer surfaces of pre-baked base filler cakes.

Our method and apparatus further comprehends the provision of mechanical apparatus and processes suited to continuous operation and of a nature such that uniform high quality of output is maintained with minimized supervision and material waste.

As another object our invention comprehends the provision of a method and apparatus for dip-coating cookies and the like wherein the steps of the process are sequentially accomplished by apparatus suited to continuous operation, and wherein such steps are readily variable to effect the changes necessary or desirable for applying different kinds or types of confectionary coatings to the surfaces of prepared fillers.

Another object of the invention is to provide a method and apparatus which, although suited to continuous operation and large production, as well as conservation of material and labor, are further conducive to, and completely commensurate with complete sanitation and cleanliness.

The invention further has within its purview the provision of a method and apparatus for dip-coating cookies which make use of an endless chain conveyor system and associated apparatus for loading prepared base cakes onto the conveyor and removing the finished cookies therefrom; the only manual operations being the placement of the base cakes into hoppers on the feeding apparatus, supplying and controlling the coating materials, and the packing of the finished cookies.

In apparatus of the conveyor type, such as that set forth in the preceding object, our invention comprehends the use of hook bars mounted between conveyor chains for carrying the cookies in spaced relationship, and in such use of hook bars, our invention has for additional objects:

(*a*) Loading the hook bars with base cakes in a manner to avoid the dangers and accidents which accompany manual loading;

(*b*) Constructing and controlling the hook bars to minimize the dip-coating material wasted by the coating of portions of those bars;

(*c*) Controlling the hook bars so as to dip-coat the filler cakes and/or cookies in a direction edgewise of the base cakes and transverse to the direction of application of the base cakes to the hook bars, thereby to effect complete coating with a minimum of loss by breakage and removal of the base cakes from the hook bars;

(*d*) Controlling the hook bars to limit dripping and the formation of projecting droplets, and to retain ample coatings on the cookies;

(*e*) Unloading the cookies from the hook bars without manual operations; and (*f*) Cleaning, sterilizing and sufficiently drying the hook bars during their continuous travel and without removing them from the conveyor chains.

For another object, our invention includes the provision of a method and apparatus for breaking and eliminating air bubbles from the coating material.

Our method and apparatus further comprehends the provision of a continuously moving system wherein the motion between dips is timed to allow sufficiently for the setting and drying of the coating material between dips and after dipping.

Our apparatus is also constructed to provide for the production of cookies requiring more than one cycle of the conveyor chain.

As another object, the invention provides for a system adapted to continuous motion in operation, and wherein the various motions and movements of parts are controlled for smooth and consistent operation.

Other objects and advantages of the invention will be apparent from the following description and the accompanying drawings, in which similar characters of reference indicate similar parts throughout the several views.

Referring to the drawings, of which there are ten sheets:

Figure 1:
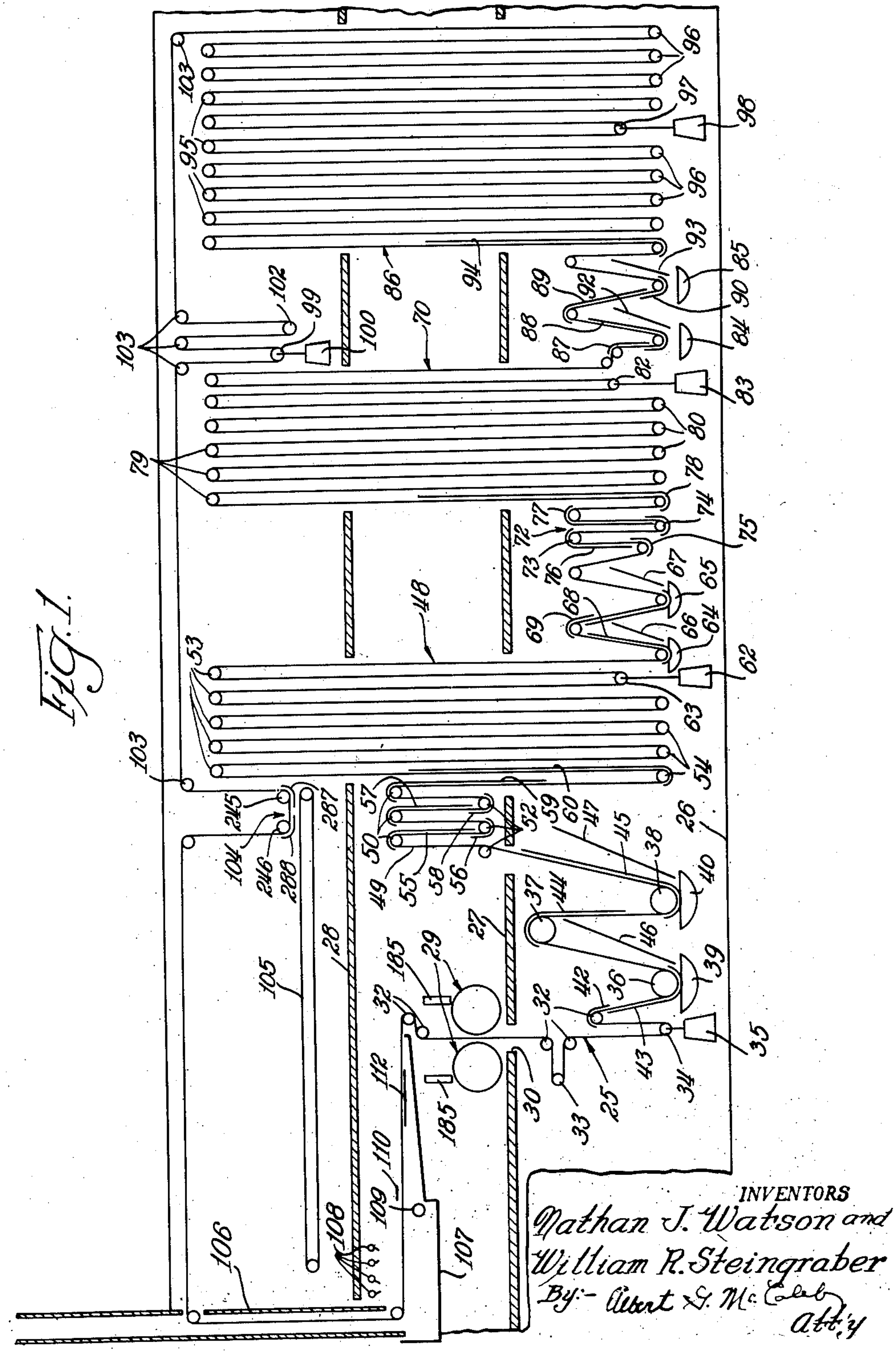
Fig. 1 is a diagrammatic side elevational view of one form of apparatus for dip-coating cookies and the like which embodies our invention in its preferred aspects and utilizes our preferred method.
Figures 2, 3, 4, 5, 6, 7:
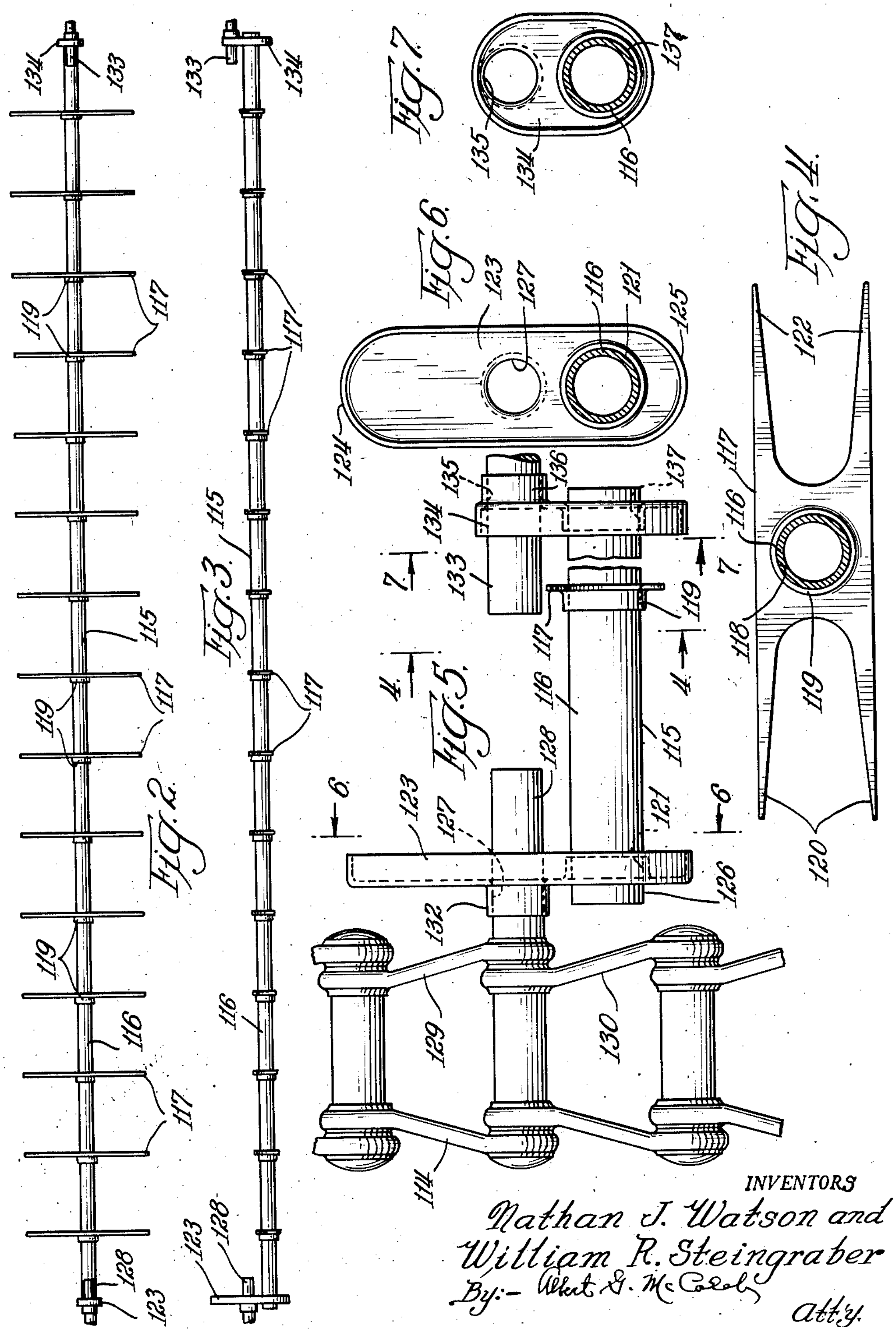
Figs. 2 and 3 are, respectively, top plan and side elevational views of parts utilized in an endless conveyor system which forms one part of our preferred apparatus.
Fig. 4 is an end sectional view, drawn to a larger scale than Figs. 2 and 3, and illustrating a part of the structure disclosed in those figures, with the section taken at a position substantially as indicated by the line 4—4 of Fig. 5 and the accompanying arrows.
Fig. 5 is a fragmentary side elevational view, drawn to an enlarged scale, which includes the parts shown in Figs. 2, 3 and 4, as well as an additional part of the aforementioned conveyor.
Figures 8, 11:
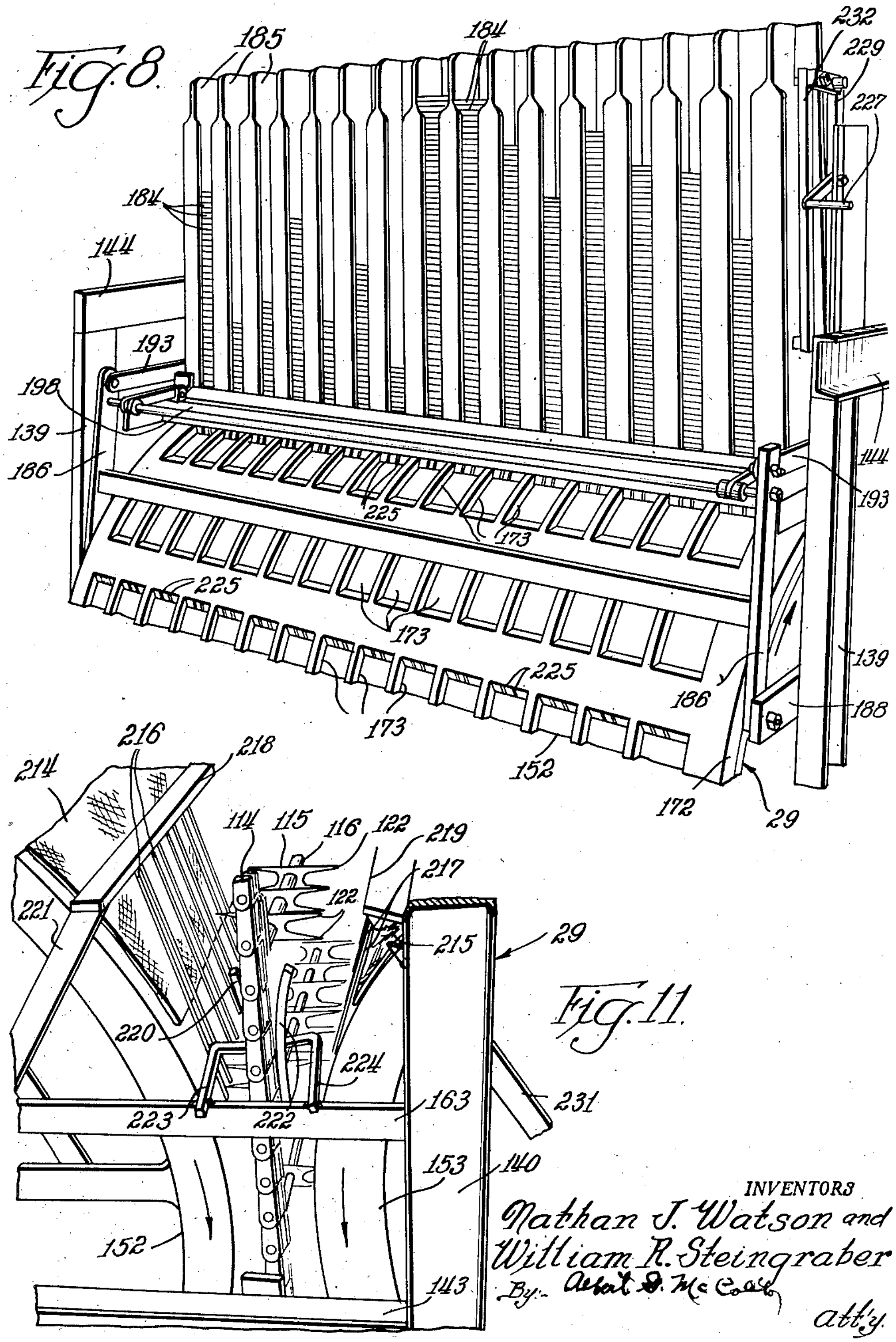
Figures 9, 10:
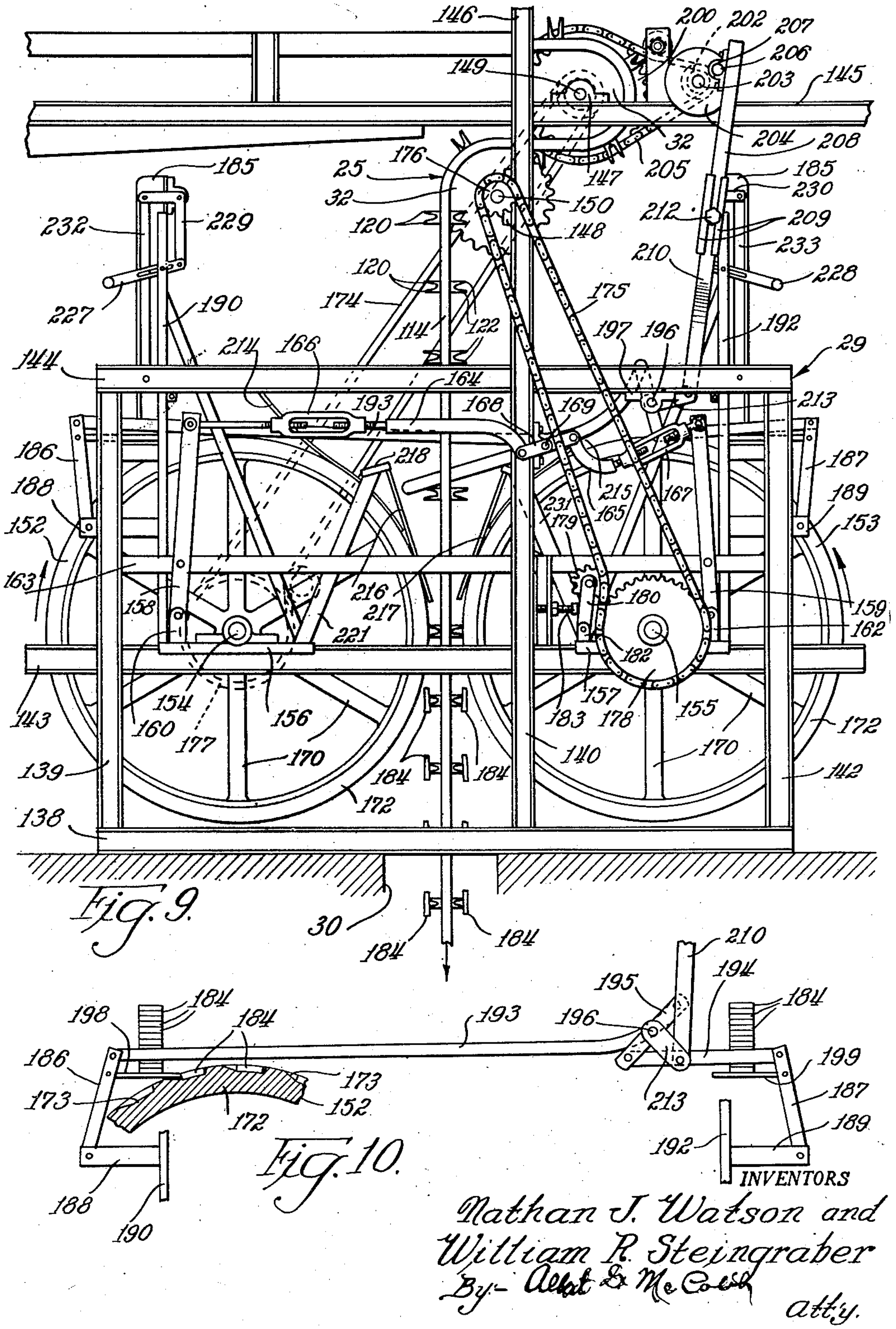
Figure 12:
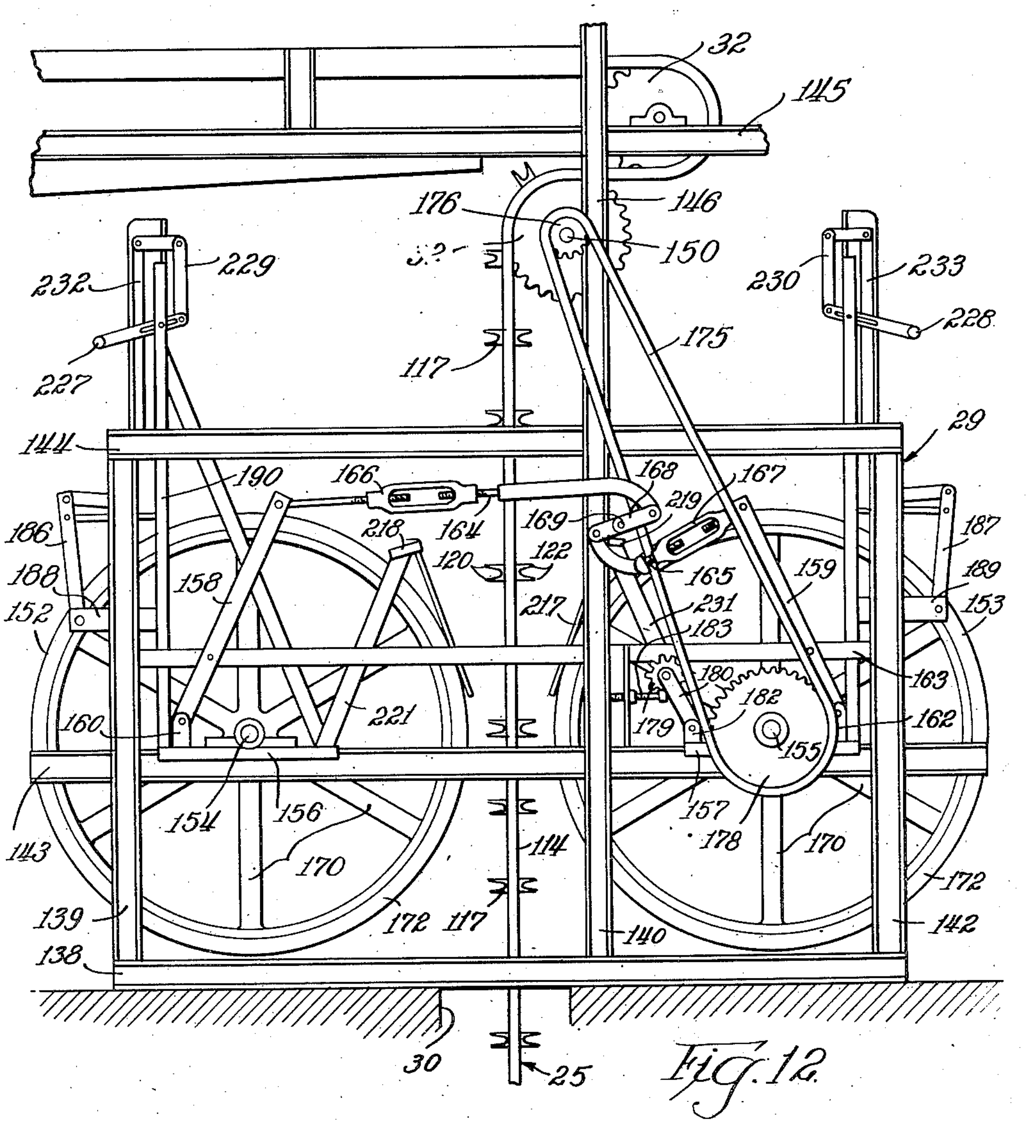
Figure 13:
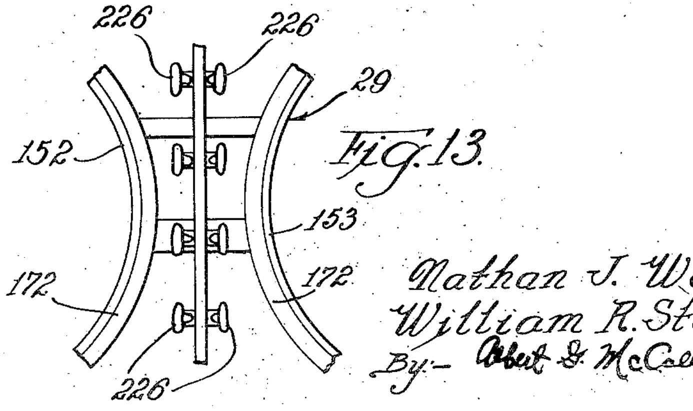
Figure 14:
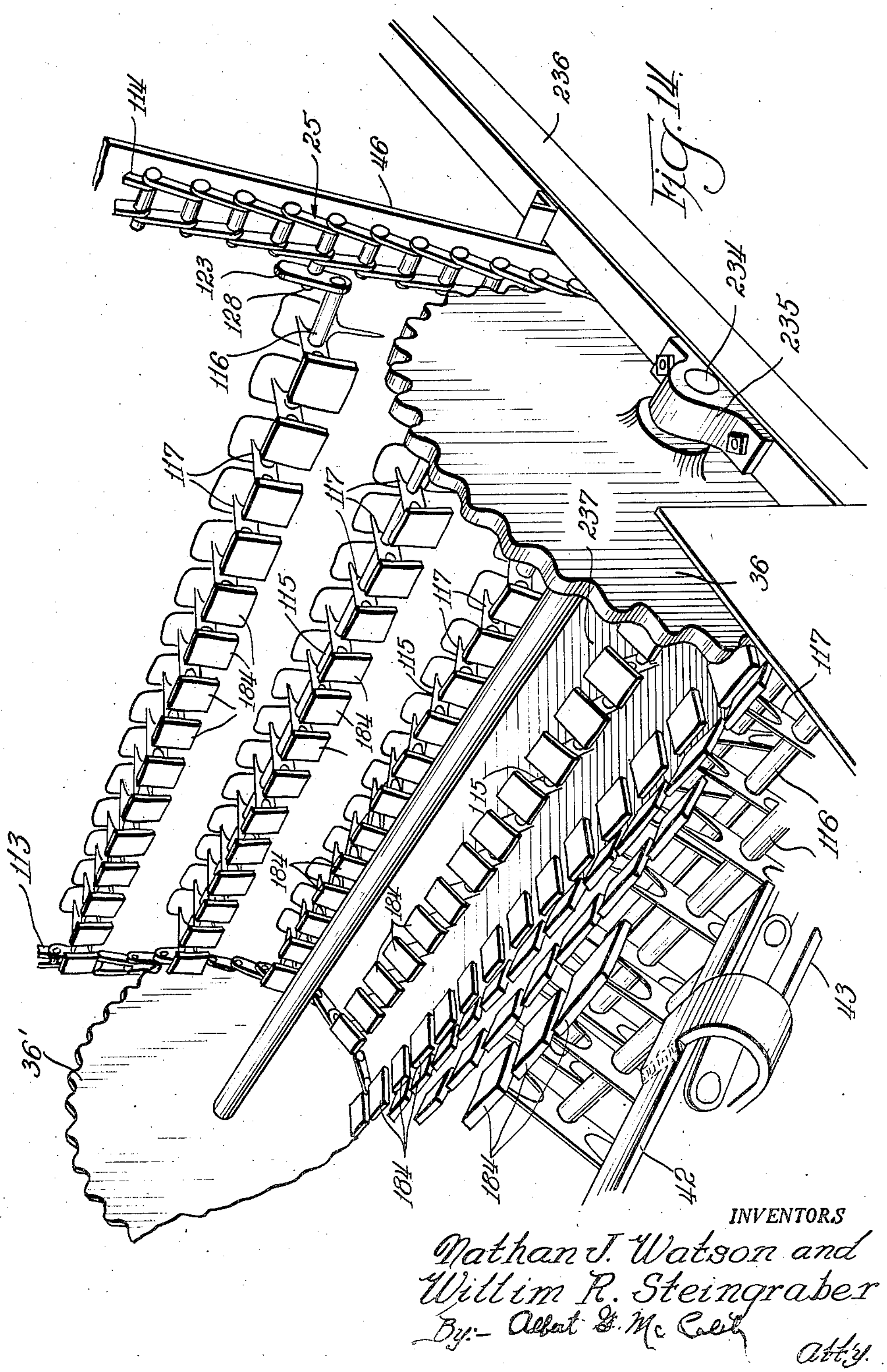
Figure 15:
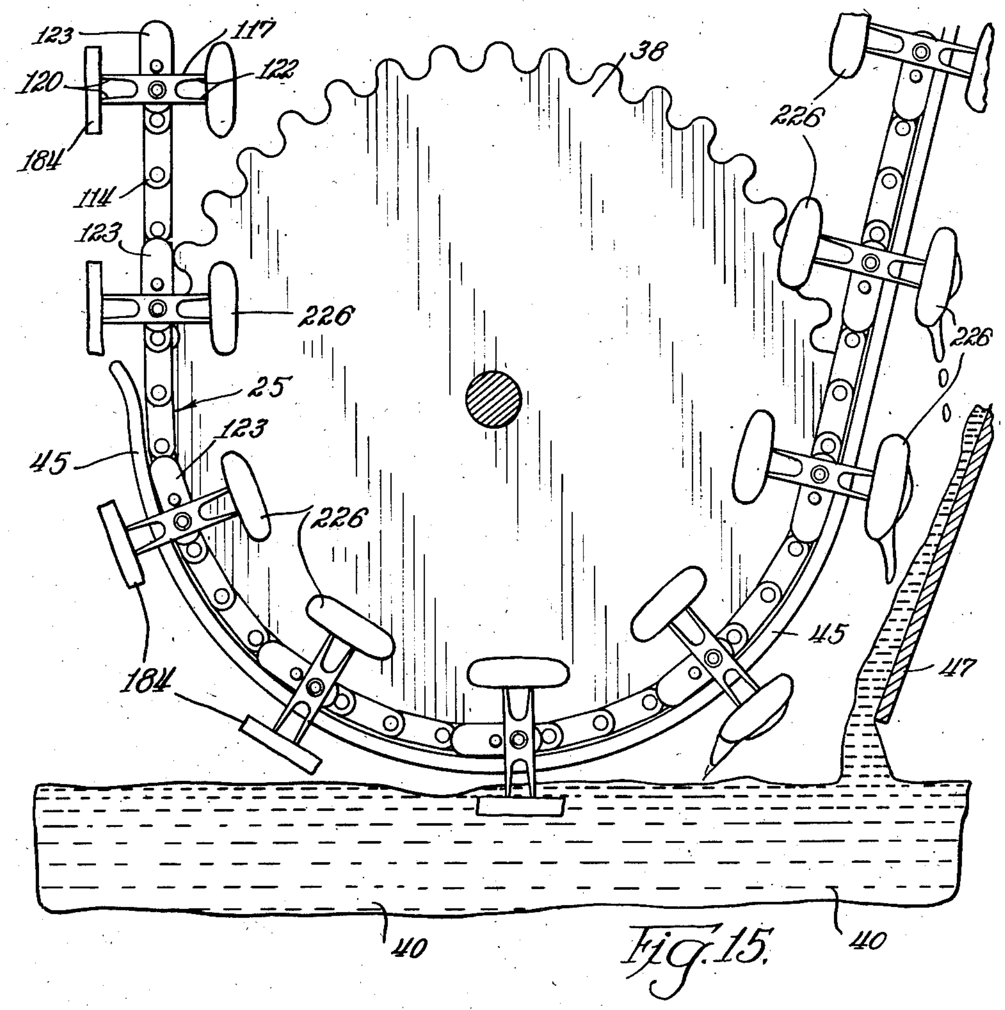
Figure 16:
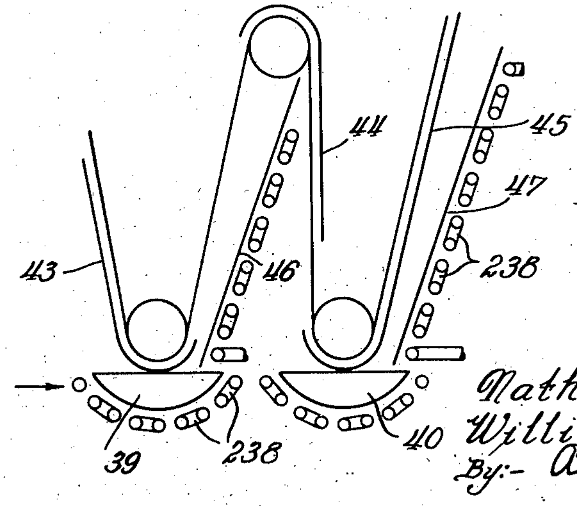
Figure 22:
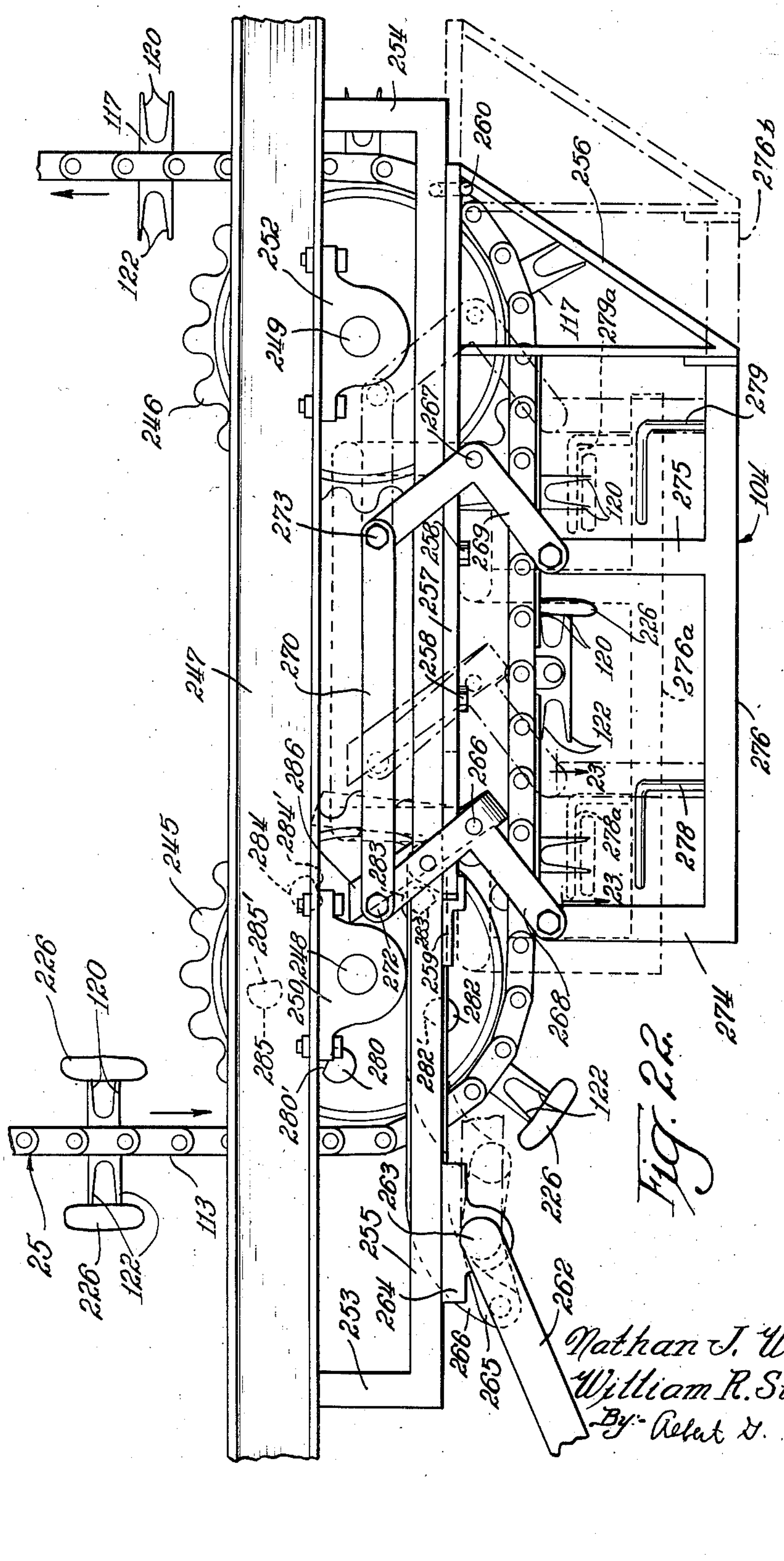
Figure 23:
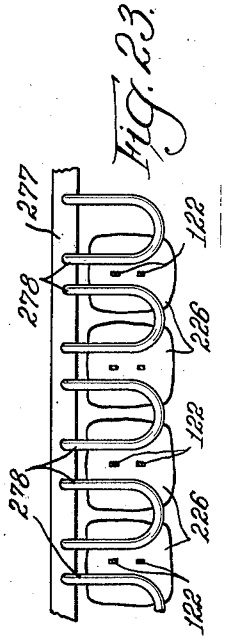

Figs. 6 and 7 are, respectively, end sectional views wherein the sections are taken substantially as indicated by the lines 6—6 and 7—7 in Fig. 5 together with their accompanying arrows;

Fig. 8 is a fragmentary perspective view depicting a portion of the apparatus embodied in Fig. 1;

Fig. 9 is a fragmentary side elevational view depicting a preferred embodiment of our conveyor loading apparatus which is included in the diagrammatic illustration of Fig. 1 and which includes the parts shown in Fig. 8 and shows the parts of such loading apparatus in one operating position;

Fig. 10 is a fragmentary sectional view which illustrates a detailed part of the loading apparatus shown in Figs. 8 and 9;

Fig. 11 is a fragmentary perspective view of a portion of the apparatus disclosed in Fig. 9;

Fig. 12 is a fragmentary side elevational view similar to Fig. 9 which illustrates a different operating position of the parts than that disclosed in Fig. 9;

Fig. 13 is a fragmentary side elevational view of a portion of the apparatus shown in Fig. 12, wherein the operating position is the same as that depicted in Fig. 12 but a different condition of operation is illustrated;

Fig. 14 is a fragmentary perspective view of another part of the apparatus disclosed in Fig. 1 and which illustrates another step in our method;

Fig. 15 is a fragmentary side elevational view of another part of the structure indicated diagrammatically in Fig. 1 and wherein an additional step of our method is illustrated;

Fig. 16 is a fragmentary and somewhat diagrammatic side view which depicts certain part arrangements in our preferred apparatus and utilized in the practice of our preferred method;

Figs. 17, 18, 19, 20 and 21 are each fragmentary side elevational views illustrating part arrangements at certain positions along our preferred conveyor system;

Fig. 22 is a fragmentary side elevational view of a part of the mechanism utilized in the apparatus of Fig. 1 and has certain different operating positions of movable parts indicated in solid and dotted lines; and Fig. 23 is a fragmentary top view of a portion of the structure shown in Fig. 22 wherein the portion of the structure illustrated is indicated by the line 23—23 in Fig. 22 and the accompanying arrows.

Considered in a relatively general way, the exemplary embodiments of our method and apparatus which are disclosed herein for illustrative purposes comprehend certain operations, sequential functions, structural elements and combinations thereof which, taken singly or together, contribute to a unified result and its accomplishment. While certain of the steps and elements might be applicable to various processes and apparatus, the present method and apparatus, as a whole, contemplates the provision of pre-baked base filler cakes, and the production therefrom of finished, dip-coated cookies or the like, of uniform quality.

In this general light of consideration, our preferred method and apparatus includes steps, parts, sequences and combinations by which the aforementioned base filler cakes are effectively, uniformly and automatically processed to produce cookies of uniform quality which are ready for packing and shipment. In terms of functions, this involves methods and apparatus for:

(*a*) Loading the prepared base cakes onto an endless conveyor;

(*b*) Dipping the base cakes in one or more of the desired coating materials;

(*c*) Taking steps in each dipping operation to avoid waste, to retain the dipped coatings on the cookies with comparative uniformity and without bubbles or appended droplets, and adequately to dry the applied coating or coatings;

(*d*) Providing for variation and pre-selection of the desired coating or coatings;

(*e*) Removing the cookies from the conveyor for packing; and (*f*) Successively cleaning, sterilizing and drying used portions of the conveyor for re-use.

While the aforementioned functional statements are brief and given without complete regard for their sequential order for the sake of brevity, they are listed to provide a preliminary understanding of the disclosed apparatus and method before entering upon a detailed description of the apparatus and a full description of our method.

Having continued regard for certain of the more general aspects of our invention and making reference to Fig. 1 of the drawings, one of the basic elements by and through which the parts of our system and apparatus are connected and associated, is an endless conveyor 25, the preferred structural details of which will be more fully described, but which, for the present consideration, may be considered as an endless carrier for the base cakes and cookies being processed; such conveyor being arranged for and capable of continuous use. The disclosed conveyor extends vertically from a base level 26 through two upper levels indicated at 27 and 28. Starting at the second level, the base cakes are applied to or loaded onto the conveyor by loading apparatus 29. In the disclosed embodiment of our invention, the loading apparatus comprises two parts, because the construction of the conveyor is such that the base cakes are similarly carried on two sides thereof.

Below the loading apparatus 29, the conveyor extends through an opening 30 in the second level and extends around guide sprockets 32 and a drive sprocket 33, as well as a tensioning sprocket 34 from which a weight 35 of suitable size is suspended. From these various sprockets, the conveyor is guided by sprockets 36, 37 and 38 to first and second dip-coating pans 39 and 40, respectively, which contain a coating material, such as marshmallow applied as the first dip-coated layer to the base cakes. As will be more fully described and explained, guides 42, 43, 44 and 45 control the parts of the conveyor upon which the base cakes are carried in order separately to effect the dipping of the base cakes on each side of the conveyor in the two associated dip-coating pans 39 and 40. Also, drip pans 46 and 47 underlie portions of the conveyor adjacent the sides thereof from which the conveyor leaves the dip-coating pans to catch the excess dip-coating material and drain it back into the dip-coating pans.

After being initially dipped, the base cakes with their initial coating thereon entering a first drying section 48 of the conveyor, an initial portion 49 of which travels in a sinuous path of relatively small amplitude over sprockets 50 and 52; while in the remainder of the drying section 48 the conveyor is guided by sprockets 53 and 54 in a sinuous path which, by preference, embodies a series of substantially vertical segments which are relatively long. In the initial portion 49 of the drying section 48, the amplitude of the successive vertical paths is relatively short and guides 55, 56, 57, 58, 59 and 60 are utilized in association with the conveyor to effect successive reversals of the positions of the dipped base cakes at preselected intervals, thereby to maintain a greater portion of the dipped coating on the base cake and limit the formation of droplets while the coating material is attaining an initial set through drying and hardening. The drying section 48 also includes a weighted tensioning element 62 attached to a sprocket 63. The length of the drying section 48 is so proportioned to the speed of the conveyor travel that the total elapsed time for a dipped base cake to pass through the section is sufficient for the coating to dry to an extent enabling the application of a second dip coating.

Thus, at the end of the drying section 48, the conveyor successively extends to dip-coating pans 64 and 65, beyond each of which is an upwardly extending portion of the conveyor associated with drip pans 66 and 67, respectively, for draining the excess material back into the dip-coating pan. As in the present instance, guides 68 and 69 are associated with the conveyor to insure the separate dipping of the partially coated base cakes on the two sides of the conveyor. In the dip-coating pans 64 and 65, the partially coated base cakes receive a layer of a coating material, such as sugar icing.

After being dipped a second time, the cookies enter a second drying section 70 of the conveyor. By preference, the drying section 70 also has an initial portion 72 wherein sprockets such as 73 and 74 guide the conveyor in a sinuous path having relatively small amplitude and from which the conveyor enters upon a succeeding portion in which the amplitudes of the path segments are considerably greater. Also, as in the previous instance, guides 75, 76, 77 and 78 control the positions of the dipped cookies to minimize the formation of droplets and retains the dip-coating material thereon until it has acquired an initial set. Beyond the initial portion of the section 70, sprockets 79 and 80 guide the conveyor and a tensioning element including a sprocket 82 and a weight 83 maintain the proper tension in the conveyor.

Although the supports for the dip-coating pans are not shown in the diagrammatic illustration of Fig. 1, it adds flexibility to the apparatus for applying it to various numbers of dip coatings and to various coating materials, as well as facilitating the cleaning of the pans, to have those pans carried by supports which permit their separation from the conveyor by being dropped from their normal coating positions. Each of the pans in the presently disclosed apparatus is thus mounted. Hence, when only two dip-coated layers are applied to a particular type of cookies, only the dip-coating pans 39, 40, 64 and 65 need be used and succeeding dip-coating pans 84 and 85 would, in such an instance, be dropped below their normal coating positions, as indicated in Fig. 1. In such an instance, a third drying section 86 which, by preference, is longer than the drying sections 48 and 70, allows the last applied coating to become well dried before the finished cookies are removed from the conveyor.

When and if more drying time is desirable between the first and second dip coatings or if a third dip coating of a material such as chocolate is desired, the pans 84 and 85 are utilized to carry such material and those pans are moved to their operative position with respect to the conveyor. As in the previously described instances, guides 87, 88, 89 and 90 are utilized for controlling the positions of the cookies on the two sides of the conveyor so that separate dipping thereof is effected. Also, as in the previous instances, drip pans 92 and 93 return excess material from the dipped cookies to the dip-coating pans and a guide 94 controls the cooky positions during its preliminary travel into the drying section. Sprockets 95 and 96 guide the conveyor through a sinuous path in the drying section 86. Also, and by preference, the section includes a weighted element 98 suspended by a tensioning sprocket 97.

Depending upon the length of the conveyor, the tensioning elements including the sprockets 34, 63 and 97 with suitable weights suspended therefrom are inserted at intervals of sufficient frequency to maintain relatively uniform tension throughout the conveyor system. In the disclosed embodiment of our invention, the sprocket 97 and its associated weight element 98 are utilized in the mid-portion of the relatively long final drying section 86 and an additional tension element including a sprocket 99 and a weight 100 suspended therefrom is utilized to tension the conveyor beyond the end of the drying section 86. It is also worthy of note that the entire conveyor, in the presently disclosed apparatus, may be driven from a single power source (not shown) with suitable drive chains or the like applying power to drive sprockets at spaced intervals along the conveyor. In this apparatus, the driving power is applied to sprockets including the sprockets 33 and driving sprockets 102, 54, 80 and 96.

Beyond the drying section 86, the conveyor passes over guide sprockets such as 103 in addition to the drive sprocket 102 and the sprocket 99 of the tensioning element to an unloading device 104 at a convenient place for packing the cookies for shipment. Associated with the unloading device 104, by preference, is a driven belt conveyor 105 which receives the cookies from the unloading device, and from which those cookies may be taken for packing.

After the cookies have been unloaded from the conveyor, it is necessary to clean any excess coating material from the conveyor parts to which it may adhere. This is accomplished, in the present instance, by passing those parts of the conveyor through a material-softening chamber 106 which somewhat resembles a chimney and receives steam and vapor from a hot water spray chamber 107 which has therein hot water spray jets 108 from which hot water is sprayed onto the parts in various directions. Finally, the washed parts of the conveyor pass a sterilizing steam jet 109. Beyond the steam jet, the conveyor passes guides 110 and 112 which move the conveyor parts in a manner for effecting the removal of moisture therefrom.

In the method and apparatus as thus far described, the conveyor has been traced through one cycle of travel or operation, with some possible variations of the method and use of the apparatus having been pointed out. When, as is usual, the cookies are completely coated and dried during one cycle of the conveyor movement, the conveyor is ready for re-use as it approaches the loading apparatus 29 from the steam sterilizer. In some instances, however, and if desirable, the unloading apparatus may be rendered inoperative and the washing and sterilizing jets shut off so that cookies may be sent through the course of the conveyor a second time for one or more additional dipping operations at selected dipping pan positions, or for a prolonged period of drying. In such an instance, the loading apparatus 29 is rendered inoperative and is retracted from the conveyor so that the retained cookies pass therethrough.

When the conveyor is started, after being completely unloaded, the loading apparatus 29 is, of course, started with the starting of the conveyor. The first dip-coating pans 39 and 40 which are used should be ready for use at practically the same time that the conveyor is started but the dip-coating pans are not raised to their operative positions until the base cakes reach those pans. The subsequently used dip-coating pans are similarly put into operation when reached by the partially coated cookies. There is then a lapse of time before the unloading device 104 need be started. On the other hand, when the conveyor is to be completely unloaded, the loading device is rendered inoperative at a selected time and the respective dip-coating pans are dropped away from the conveyor for cleaning and draining after the last of the un-dipped base cakes have passed therethrough. The unloading device continues to operate until all of the cookies are removed from the conveyor. It is also desirable from the standpoint of cleanliness and sanitation that the washing and sterilizing apparatus be kept in operation until the conveyor is completely cleaned after each period of use.

Considering certain features of our method and apparatus in greater detail, reference is first made to Figs. 2 to 7, inclusive, of the drawings. The endless conveyor 25, in the preferred embodiment of our invention, comprises two laterally parallel, flexible and endless carrying elements which, in the present instance, are chains 113 and 114 (Fig. 14) between which a series of hook bars 115 are carried in longitudinally spaced relationship. By preference, the spaces between the hook bars are substantially equal.

As shown in Figs. 2 to 7, inclusive, each hook bar includes a substantially straight and preferably tubular cross bar 116 of a length somewhat shorter than the distance between the two chains 113 and 114. A series of hook plates 117 made of relatively thin and flat sheet metal have central apertures 118 surrounded by extruded integral flanges 119 and are pressed onto each cross bar and carried thereby in fixed positions spaced longitudinally of the cross bar. Each such hook plate, as shown in Fig. 4, has opposed bifurcated ends presenting oppositely projecting and spaced pairs of tangs 120 and 122 which are relatively sharp at their outer ends. Each pair of tangs is adapted to be easily pressed into the base cake of a cooky and to carry such base cake during the dipping and drying operations.

At one end, each of the cross bars 116 is secured to a guide plate 123, as shown in Figs. 5 and 6, at a position near one end of the guide plate by being pressed into a flanged aperture 121. Each such guide plate preferably has convexly arcuate ends 124 and 125. Preferably, the cross bar projects through the guide plate so as to present a relatively short projecting end 126 on the outside of the guide plate. Also, each guide plate has an aperture 127 located substantially at the center thereof which serves as a bearing to support the end of the hook bar for free rotation relative to a stud shaft 128 projecting from the inside surface of one of the conveyor chains at the axes of adjoining chain lengths such as 129 and 130 in Fig. 5. Such stud shafts extend inwardly from each chain at the axes of each predetermined number of lengths. In the preferred embodiment of our invention, each guide plate has a flange 132 on its outer surface adjacent the central aperture 127, which flange preferably has an external diameter smaller than the diameter of the outer projecting end portion 126 of the cross bar.

At their other ends the hook bars 115 are guided relative to similar and aligned inwardly projecting stud shafts 133 on the opposed chain by support plates 134. Although said other ends of the hook bars may be carried by support plates of a construction like that of the support plates 123, the disclosed embodiment includes the shorter plates 134. Each such support plate 134 has an aperture 135 therein which provides a bearing adapted to free rotation on the stud shaft 133. Also, and by preference, a flange 136 is provided on the outer surface of the support plate adjacent the aperture 135 to extend the bearing surface. At a distance from the aperture 135 which is equal to the spacing between the apertures 127 and 121 in the guide plate 123, a flanged aperture 137 has the other end of the cross bar 116 press fitted therein, so that each cross bar is suspended between the two chains for rotational movement about an axis displaced from the axis of the cross bar. Thus, normally the cross bars tend to hang below the axes of rotational movement provided by the opposed stud shafts 128 and 133. Since the projecting lengths of the flanges 132 and 136 on the outer surfaces of the guide plate 132 and support plate 134, respectively, are such that those plates are spaced from the chain, the normal hanging position of the bars is maintained irrespective of the path of the chain and unless deflected from that normal position by guide means or the like. Also, the positions of the hook plates relative to the cross bars are such that when the hook bars are in their normal hanging positions, the tangs 120 and 122 on each cross bar are aligned and project in directions normal to the direction of displacement of the cross bars relative to their respective stud shafts.

Having now described certain general aspects of our preferred method and apparatus and certain details of the structure of our preferred type of endless conveyor, reference will be made to Figs. 8 to 13, inclusive, for a more detailed description of our preferred loading apparatus 29 and its manner of operation for the placement of base cakes upon the projecting tangs 120 and 122 of the hook bars 115 which comprise carrying elements of our endless conveyor 25. This loading apparatus is carried by a frame including base beams such as 138 to which are secured upwardly extending support posts 139, 140 and 142. Above the base beam 138, the support posts 139, 140 and 142 are connected by cross beams 143 and 144. The framework thus far described comprises a part of the general framework including beams such as 145 displaced at positions above the cross beams 144 and connected to an upwardly extending portion 146 of the support post 140.

Above the loading apparatus 29, bearing blocks 147 secured to the beams 145 and bearing blocks 148 secured to the upwardly extending portions 146 of the support posts 140, respectively, support shafts 149 and 150 upon which the guide sprockets 32 are mounted for guiding the conveyor chains 113 and 114 in laterally spaced relationship. The said guide sprockets 32 are drivingly connected to the shafts 149 and 150, and those shafts are rotatably journaled in the bearing blocks 147 and 148. From the lower of the guide sprockets 32, the conveyor 25 extends downwardly, as shown in Figs. 1 and 9, between circular drums 152 and 153 located on opposite sides of the conveyor with their axes substantially parallel to the general plane of the conveyor chains. The adjacent surfaces of the drums 152 and 153 are normally spaced apart and the hook bars 115 of the conveyor 25 pass therebetween with the tangs of the hook plates extended toward the opposed drum surfaces.

The normal positions of the drums for loading purposes are shown in Fig. 9. The drums 152 and 153, respectively, however, are carried on shafts 154 and 155, which shafts in each instance are journaled in slide blocks 156 and 157 supported for linear movement on the top surfaces of the cross beams 143. A linkage including levers 158 and 159 hingedly connected to brackets 160 and 162 on opposite ends of the slide blocks 156 and 157, respectively, and supported for swinging movement relative to a cross strap 163 secured to the support posts 139 and 142, is utilized to actuate and control the positions of the respective slide blocks. Also included in the said linkage are tie rods 164 and 165, each of which has a hinge connection to the end of one of the levers 158 and 159 opposite the lever fulcrum from the slide blocks 156 and 157, and one of which includes a turnbuckle 166 and the other a turnbuckle 167 for length adjustment purposes. Intermediate the levers 158 and 159, the tie rods 164 and 165 are connected by links 168, which latter mentioned links are nonrotatably secured to opposite ends of a shaft 169. It is to be understood that similar linkages and levers are utilized on both sides of each drum. Thus, when the shaft 169 is rotated by manual operation of a suitable handle or the like, the upper ends of the levers 158 and 159 may be moved toward each other, to positions such as those shown in Fig. 12, to effect separation of the slide blocks 156 and 157, respectively. On the other hand, rotation of the shaft 169 in the opposite direction effects movement of the levers to positions such as those shown in Fig. 9. When in the separated positions indicated in Fig. 12, the projecting ends of the tangs 120 and 122 on the hook bars 155 pass freely between and in spaced relationship to the opposed surfaces of the drums 152 and 153.

It is understood that similar side frames, slide blocks and actuating linkages are provided on opposite sides of the drums, so that rotation of the single shaft 169 effects similar movements of both sides of each drum relative to their respective side frames.

By preference, each drum comprises a relatively hollow structure with spokes such as 170 at the opposite ends for supporting the drum relative to the shaft upon which it is mounted. In our preferred structure, outer surfaces 172 of the drums are generally cylindrical and are made of wood with peripherally spaced rows of axially aligned pockets 173 in the outer surface thereof, as shown in Fig. 8. Axially of the drums, the mid-portions of the pockets 173 are spaced for alignment with the hook plates 117 on the hook bars 115. Also, the peripheral spacing of the rows of pockets conforms to the spacing between the successive hook bars on the conveyor so that in operation the projecting tangs 120 and 122 align substantially with the mid-portions of the pockets.

For driving the drums 152 and 153 in synchronism with the movement of the conveyor 25 so that alignment is maintained between the pockets 173 and the projecting tangs on the successive hook bars 115, we have utilized drive chains 174 and 175 which interconnect sprockets such as 176 (Fig. 9) on opposite ends of the shaft 150 with drum driving sprockets 177 and 178 on opposite ends of the shafts 154 and 155, respectively, the drum driving sprockets being at opposite ends of the respective shafts to effect the proper direction of rotation for their respective drums.

In order to keep the respective drive chains 174 and 175 in taut driving relationship to their respective sprockets regardless of the positions of the slide blocks 156 and 157 which support the drum shafts, we have provided idler gears such as 179 which are supported for rotation in meshing engagement with their respective drive chains at positions displaced from the driving sprockets by arms such as 180 hingedly connected to brackets 182 on adjacent ones of the slide blocks. The mid-portions of the arms 180 are engaged by adjusted fulcrums 183 secured to the side frames so that, as shown in Figs. 9 and 12, the idler gears are held in contact with the drive chains when the drums are moved toward and from one another.

The pockets 173 in the drum surfaces are of a size and depth to receive and hold base cakes with their exposed surfaces substantially flush with the peripheries of the drums. For maintaining a supply of base cakes 184 to be fed into the pockets of each of the drums as those drums rotate, we have provided a series of hoppers which are axially aligned with the drums above and to the outside of the center thereof, as shown in Figs. 8 and 9. These hoppers are preferably open at the front to provide ready visual indication of their need for filling, and are open at the top so that base cakes placed therein at the top normally gravitate therethrough.

The feeding mechanism by which the base cakes are moved from the hoppers into the successive rows of pockets in the drums is depicted in Fig. 10. In this mechanism levers 186 and 187 are carried for swinging movement by arms 188 and 189, respectively, supported by upright support strips 190 and 192 from the slide blocks 156 and 157, respectively, which support strips are secured to the slide blocks and also carry the hoppers 185 for movement with the slide blocks and their respective drums. At their other ends, the levers are connected by tie strips 193 and 194, the adjacent ends of which tie strips are connected through a movable link 195. The movable link 195 is supported for rotational movement about the axis of a shaft 196 carried by bearing blocks such as 197 on the cross beams 144. Intermediate their respective ends, the levers 186 and 187 are hingedly connected to pusher plates 198 and 199, which pusher plates underlie the hoppers which are associated with each of the drums. When the movable links 195 are moved to positions such that the tie strips 193 and 194 are extended and separated, the pusher plates are retracted from positions under the base cakes in the hoppers. When the link 195 is then actuated to a position such as that shown in Fig. 10, the pusher plates are drawn inwardly toward the drums and each one pushes a row of base cakes into a row of the pockets.

A driving mechanism is provided for actuating the pusher plates 198 and 199 in synchronism with the movement of the drums. This driving mechanism includes a sprocket 200 drivingly connected to the shaft 149, as shown in Fig. 9. An aligned sprocket 202 is drivingly connected to one end of a shaft 203, upon the opposite end of which shaft a driving disc 204 is mounted. The aligned sprockets 200 and 202 are drivingly connected by a drive chain 205. A stud shaft 206 projects outwardly from the outer surface of the driving disc 204 in eccentric relationship to the shaft 203 and is journaled in a bearing block 207 secured to one end of a connecting strip 208. At the other end of the connecting strip 208, side channels 209 provide a slide connection to a second connecting strip 210 for drivingly connecting the connecting strips 208 and 210. A connecting pin 212 is mounted in aligned openings in the two strips at the mid-portion of the side channels. The other end of the connecting strip 210 is connected for rotational movement to a lever arm 213 which projects angularly from one of the movable links 195 and is secured thereto. Thus, the reciprocating motion of the connected connecting strips 208 and 210 effects rotational movement of the links 195 relative to the axis of the shaft 196, thereby to produce a reciprocating movement of the pusher plates which is synchronized with the movements of the conveyor and drums.

When the feeding of base cakes from the hoppers to the pockets of the drum is to be stopped, the pin 212 is removed so that the connecting strip 208 will move relative to the connecting strip 210, although their ends are held in adjacent relationship by the side channels 209.

As viewed in Figs. 9 and 11, the conveyor 25 moves downwardly and the peripheral surfaces of both drums which are adjacent the conveyor also move downwardly. Hence, the base cakes from the hoppers 185 move inwardly from those hoppers on the upper surfaces of the drums and thence downwardly to positions adjacent the hook bars of the conveyor. Being positioned and driven in synchronism with the drums, the projecting tangs of the hook plates are forced into the base cakes as those hook plates pass between the drum surfaces when the drums are disposed in their closely spaced relationship, as shown in Fig. 9. With the tangs forced into the base cakes, they are transferred from the drums to the hook plates of the conveyor and carried away from the drums by the conveyor as indicated in Fig. 9.

In order better to hold the base cakes in the pockets 173 of the drums, and as shown in Fig. 11, pieces 214 and 215 of a flexible material, such as heavy cloth, are anchored to the cross beams 144 of the frame and extend inwardly and downwardly over the drum surfaces. These cloth pieces have a tendency to position the base cakes in the pockets and hold those base cakes in their proper positions. However, as the drum surfaces become more nearly perpendicular, it has been found desirable to provide elongated resilient fingers 216 and 217 in the nature of spring wires which are anchored at one end to cross strips 218 and 219 and extend downwardly along the drum surfaces in alignment with the pockets and out of alignment with the hook plates. These wire fingers 216 and 217 are biased lightly against the drum peripheries and hold the base cakes until they are engaged by the tangs of the hook plates. The cross strips 218 and 219 are supported from the slide blocks 156 and 157, respectively, by upwardly extending arms 221 and 231.

In order to steady the conveyor chains as they pass between the drums, guide fingers 220 and 222 are secured to the side frames by brackets 223 and 224, respectively, and extend along opposite sides of the conveyor chains.

In order to facilitate the removal of the base cakes from the drum pockets by the hook bars of the conveyor and thereby to minimize breakage of the base cakes when thus removed, it has been found expedient to provide metal inserts 225 at the edges of the pockets which are lowermost on the drums when the base cakes are removed and against which the base cakes gravitate in the pockets. These metal inserts act as tracks and reduce the frictional engagement between the base cakes and the pockets.

When it is desired to operate the conveyor without having base cakes picked up by the hook bars, as when the conveyor is being unloaded, the drums are separated, as shown in Fig. 12. Such separation of the drums is also useful in the event that coated or partially coated cookies, such as 226 in Fig. 13, are to be recirculated by the conveyor for any reason, such as a delayed dipping operation or for additional drying.

In order to facilitate the handling of base cakes of different lengths, slotted handles 227 and 228 are carried by the upright support strips 190 and 192, respectively, in positions convenient to the operator. These handles actuate bell cranks 229 and 230, respectively, and connected toggle links 232 and 233, respectively, to shorten or lengthen the space in the hopper.

For consideration of the dipping operations in greater detail, reference is now made to Figs. 1 and 14. As shown in Fig. 14, the sprocket 36 which carries one of the conveyor chains adjacent the first dip pan 39 is rotatably supported by a shaft 234, upon which shaft is mounted a similar sprocket 36′ in coaxial relationship for carrying the other chain of the conveyor. At its ends the shaft 234 is journaled in bearing blocks, such as 235, which are secured to supporting frame members, such as 236.

The guides 42 and 43 which extend along certain portions of the chain 114 for engagement with the guide plates 123 on the hook bars for controlling the positions of the hook bars are, in the disclosed apparatus, strap iron strips which extend along the desired and indicated portions of the chain in alignment for engagement with the guide plates 123. Thus, when a particular hook bar moves upwardly from the tension sprocket 34 toward the guide 42, the cross bar 116 is in its normal position below the axis of the studs 128 and 133. Then, when the guide plate 123 engages the guide 42 and the chain moves over the adjacent sprocket 32, the guide bar is inverted so that the cross bar 116 is above the axis of the studs 128 and 133. This reverses the positions of the projecting tangs 120 and 122.

As may be noted by reference to Figs. 1 and 14, the guides 42 and 43 overlap so that they keep the guide bars in positions inverted with respect to their normal positions as they approach and pass through the dip pan 39. Since the guide 43 extends around the lower surface of the socket 36, the hook bars are guided and restrained from free movement as the base cakes pass through the dip-coating material. With the disclosed disposition of the tangs with reference to the guide plates on the hook bars 115, the base cakes are moved edgewise through the dip-coating material, as shown in Fig. 14, and the force of the dip-coating material against the base cakes is lateral to the direction of application of the base cakes to the tangs, so that there is little, if any, tendency for the dip-coating material to effect removal of the base cakes from the tangs. The disclosed direction of movement of the base cakes through the dip-coating material also provides a good thorough coating of the base cakes.

As shown in Fig. 14, the level of the dip-coating material which is indicated at 237 is maintained to insure coverage of the base cakes on the lower side of the hook bar, but is insufficient to reach the hook bar. Thus, by avoiding the coating of the hook bar, a considerable amount of material waste is prevented. Only small portions of the tips of the projecting tangs are coated with material which must later be removed as waste. The area of the projecting tips of the tangs is so small that the waste is negligible.

As the dipped base cakes move away from the dip pan 39 after dipping, there is naturally an excess of coating material on those base cakes. This excess coating material drips off and gravitates to the pan 46, from which it runs back into the dip pan 39.

It is also to be noted that the guide 43 terminates as the conveyor starts upwardly from the dip pan 39. The termination of this guide allows each hook bar to swing back by gravitational force to its normal position a short time after the dipped base cakes pass from the dipping pan. This action causes the dip-coating material to even out over the surface of the base cake and limits the formation of droplets. At the top of the upward movement away from the dip pan 39, the hook bars are again inverted by the guide 44 and remain inverted for a portion of the downward movement toward the dip pan 40. At the end of the guide 44 which is above the dip pan 40, the hook bars again return to their normal positions. In such normal positions the guide 45 becomes effective, as shown in Figs. 1 and 15, to force the un-dipped base cakes on the opposite sides of the hook bars from those previously dipped through the dip-coating material in the second dip pan 40.

As in the previously described dipping operation, the level of the dip-coating material in the dip pan 40 is sufficient to cover the lower base cakes on each hook bar but is maintained below a level at which it would coat the cross bars 116. Also, as in the previous dipping operation, some excess material drips from the manually dipped base cakes onto the drip pan 47, and is thence returned to the dip-coating pan.

As depicted in Fig. 16, the dip-coating pans 39 and 40 and their associated drip pans 46 and 47, respectively, are preferably heated to a relatively uniform temperature for maintaining the proper consistency of the dip-coating material and for maintaining the material on the drip pans in a fluid state for return to the dip-coating pans. In the disclosed structure, the heating elements are disclosed as hot water pipes 238 forming grids or the like adjacent the lower surfaces of the drip pans and dip-coating pans.

Following the second dipping operation, the conveyor path and the guides 45, 55, 56, 57, 58, 59 and 60 are arranged as indicated in Fig. 1 to provide a series of relatively frequent inversions of the positions of the coated base cakes in order to effect the formation of a smooth coating and to retain the material on the dipped base cakes.

The additional and subsequent dipping operations are accomplished in much the same manner as those described, with guides arranged to control the positions of the hook bars for separately effecting the dipping of the partially coated base cakes on the two sides of the hook bars, as well as reversing the positions of the hook bars for producing smooth coatings and retaining the material. With different types of coating materials, the dip-coating pans used for holding the material and the application of heat to those pans are chosen to suit the characteristics of the dip-coating materials used.

A coating material such as marshmallow is often used for the initial coating of the base cakes; the marshmallow being then followed by sugar icing or chocolate, as desired. In view of the tacky characteristics of marshmallow, it has been found desirable to break bubbles on the surfaces of the coated base cakes relatively soon after each dip-coating operation.

Figures 17, 18:
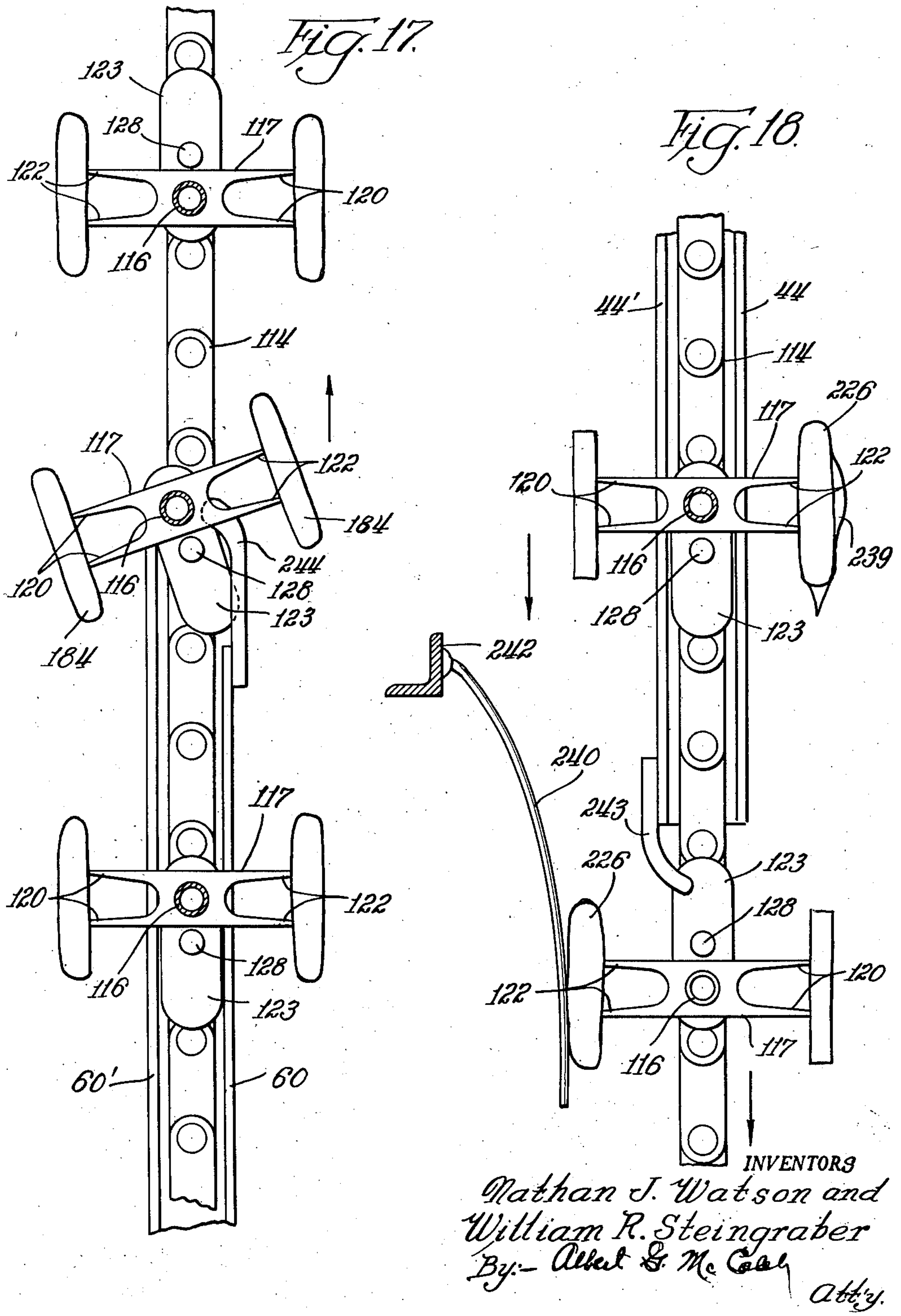

In the preferred embodiment of our invention, and as depicted in Fig. 18, the breaking of bubbles is accomplished for the first coated base cakes at the lower end of the guide 44. The actual breaking of the bubbles, such as that indicated at 239, is effectively accomplished by causing the exposed outer faces of the dipped base cakes to strike against and drag along the surfaces of relatively thin and resilient wires 240 carried by an angle strip 242 on the conveyor frame.

In order to effect consistent and comparatively smooth movements of the hook bars relative to the chains and to prevent oscillatory swinging movements thereof and the like, a second guide strip 44′ is utilized in substantially parallel relationship to the guide 44 in a position such that the guide plates move therebetween to restrict rotational movements of the guide plates in either direction. At the lower end of the guide strip 44′, a curved finger 243 is secured to that guide strip and extends inwardly at a position such that it is aligned with the projecting end portions 126 of the cross bars 116. The inner end of the finger 243 is positioned to pass the studs 128 and flanges 132 without contact therewith. However, since the diameters of the projecting end portions of the cross bars 116 are larger than the flanges 132, the finger contacts the projecting ends of the cross bars consistently to effect rotational movement of the hook bars in one direction. As viewed in Fig. 18, the engagement of the finger 243 with the projecting end of a cross bar causes swinging movement of the hook bar in a clockwise direction, the movement continuing by the force of gravity after being started until the hook bar reaches the position such as that indicated by the lower hook bar. Also, as viewed in Fig. 18, the conveyor is moved downwardly. During such downward movement of the conveyor, the hook bar movement is controlled by the conveyor speed as a result of the cam action provided by the rolling of the end of the guide plate 123 against the end of the guide 44′.

After the dipping of the base cakes on the second side of each hook bar, the breaking of the bubbles is accomplished by wires such as 240 which engage the outer faces of the dipped base cakes at a position along the guide 55 (Fig. 1).

During vertical upward movements of the conveyor, consistent and smooth turning movement of the hook bars is accomplished by a structure such as that depicted in Fig. 17. One position for the use of the guide structure shown in Fig. 17 is in the first drying section 48 where the conveyor moves upwardly in association with the guide 60. By preference, a substantially parallel guide strip 60′ is utilized at least near the upper end of the guide 60. A finger 244 secured to the end of the guide 60 at a position for engagement with the projecting end portion 126 of the cross bar 116 extends inwardly to start the movement of each hook bar in a counter-clockwise direction, as viewed in Fig. 17. Upon being started in that direction, the guide plates 123 of the hook bars engage and turn relative to the end of the guide strip 60′ so that the rotational movement of each guide bar is related to the rate of the conveyor movement.

In instances such as that illustrated in Fig. 21, wherein the guide 45 is disposed below the guide plates 123 and the conveyor is moving upwardly on an angle to the perpendicular, gravitational force consistently controls the direction of rotational movement of the hook bars and the guide plates on those hook bars are cammed by the upper end of the guide 45 to effect relatively uniform rotational movements of the hook bars.

Figures 20, 21:
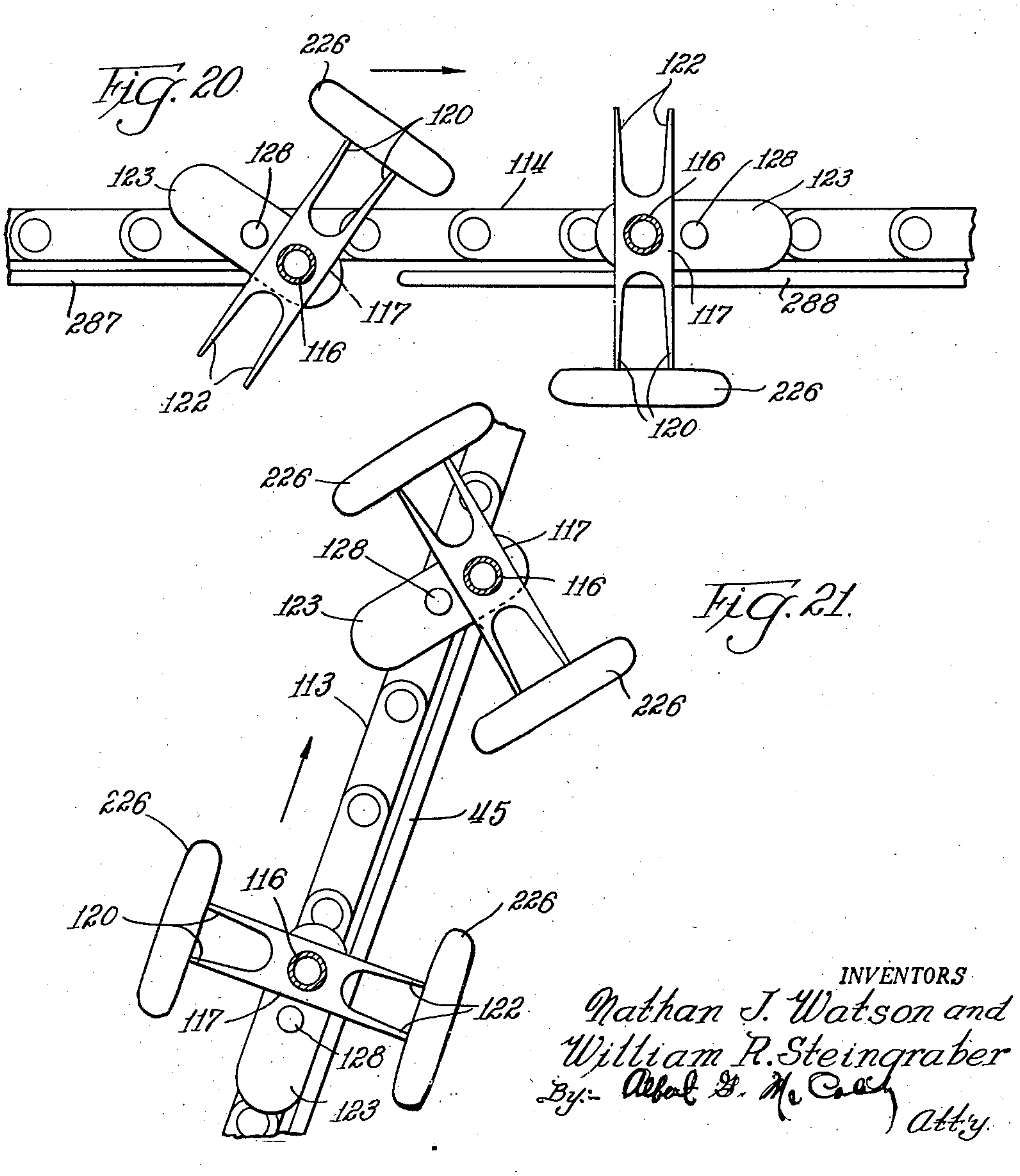

After the base cakes have been applied to the conveyor, dip-coated with the desired coating materials and sufficiently dried, they are removed from the hook plates of the conveyor hook bars by the unloading apparatus 104 which is illustrated in detail in Figs. 20, 22 and 23. Having particular reference to Fig. 22, conveyor guide sprockets 245 and 246 are disposed in spaced relationship relative to a conveyor frame member 247; the sprockets being supported for rotational movement by shafts 248 and 249, respectively, which are journaled in bearing blocks 250 and 252 secured to the frame member 247. As viewed in Fig. 22, the conveyor moves downwardly at the left hand side of the figure, across the space from left to right between the sprockets and upwardly at the right hand side of the figure. An auxiliary frame including side arms 253 and 254 and a connecting beam 255, is secured to the frame member 247 and has a second auxiliary frame 256 suspended therefrom for linear movement along the first mentioned auxiliary frame; the said second auxiliary frame including a top strip 257 supported from the beam 255 by fastening means such as cap screws 258 which extend through longitudinal slots in the top strip 257. At one end an angle bracket 259 provides a stop for determining one limit of movement of the second auxiliary frame relative to the first mentioned auxiliary frame. At the other end a hook 260 secured to the beam 255 affords additional support for the second auxiliary frame.

Movement of the second auxiliary frame 256 longitudinally of the beam 255 is effected by manual swinging movement of a handle 262 about the axis of a shaft 263 journaled in the bearing block 264 which is secured to the beam 255. The shaft, in turn, swings a crank arm 265 to effect movement of a link longitudinally of the beam 255, which link is connected at its end opposite the crank arm 265 to the strip 257 of the second auxiliary frame.

Through fastening means such as pins 266 and 267, bell cranks 268 and 269, respectively, are supported for rotational movement about parallel axes spaced longitudinally of the top strip 257 of the second auxiliary frame. At their upper ends, the arms of the bell cranks are connected together by a link 270 rotatably secured to each of the crank arms by fastening means such as bolts 272 and 273, whereby movement of one bell crank effects similar movement of the other. At their other ends the bell cranks 268 and 269 are connected to and carry arms 274 and 275 of a drop frame 276.

The drop frame 276 carries cross bars such as 277 (Fig. 23), which cross bars support a series of loop-type cooky-engaging fingers 278 and 279. As shown in Fig. 23, the loop-type fingers are spaced longitudinally of the cross bars 277 to fit between the tangs of adjacent hook plates on the hook bars. Also, the two cross bars 278 and 279 are spaced along the drop frame 276 a distance equal to a multiple of the space between adjacent hook bars on the conveyor.

The drop frame and its supported cooky-carrying fingers are actuated by the bell cranks 268 and 269 for vertical and longitudinal movement in an arcuate path in timed relationship to the movements of the conveyor between positions such as those indicated by solid lines at 276, 278 and 279 and by dotted lines at 276*a*, 278*a* and 279*a*. In the raised positions depicted by the dotted lines, the fingers extend between the tangs of adjacent hook plates on the hook bars and overlie portions of adjacent cookies carried by those tangs. Upon downward movement of the fingers, the cookies are removed from the hook bars. It is to be noted that during the downward movement, the arc of movement of fingers provides longitudinal movement thereof in the direction of the conveyor movement. This has a tendency to prevent breakage of cookies and enlargement of the holes left by the tangs.

For accomplishing the movements of the drop frame in synchronized relationship to the movements of the conveyor, a plurality of axially projecting cam studs 280, 282, 283, 284 and 285 are secured to the sprocket 245 in alignment for engagement with a cam lug 286 on the bell crank 268. As the cam studs move upwardly in engagement with the cam lug 286, they actuate the bell cranks 268 and 269 to raise the drop frame. However, when a limit of movement of the cam studs is passed, the cam lug is disengaged to allow the drop frame to fall. By preference, the stud-engaging end of the cam lug 286 is relatively sharp and the cam studs have flat surfaces 280′, 282′, 283′, 284′ and 285′ so disposed that the release of the drop frame for falling movement is abrupt.

Since the bell cranks 268 and 269 are carried by the top strip 257 of the second auxiliary frame and are thus linearly movable with that frame, the cam lug 286 may be moved into and from a position for operative engagement with the cam studs on the sprocket 245. When in the position indicated by solid lines, such operative engagement of the cam lug and the cam studs is effected. However, when the handle 262 is actuated to move the second auxiliary frame to the position depicted at 276*b*, the unloading apparatus is rendered inoperative.

The manner and structure for turning the hook bars over for the removal of the cookies from both sides thereof by the unloading apparatus is illustrated in Fig. 20. As the hook bars approach the first cooky-engaging fingers 278, they are guided and retained by a guide strip 287. While thus guided by the guide strip 287, the cooky is removed from the lower side thereof. At the end of the guide strip 287, the hook bar revolves over the end of the guide strip in a clockwise direction, as viewed in Fig. 20, and as indicated, to assume a position in which the cross bar 116 is suspended below the axis of the supporting studs. Continued movement of the conveyor effects engagement of each of the guide plates 123 with the end of a guide strip 288. This effects continued clockwise movement of the hook bar, as viewed in Fig. 20, to place the remaining cookies in the lower position for removal therefrom. The second cookies on each of the hook bars are removed by the second cooky-engaging fingers 279.

From the unloading device, the conveyor passes into the material-softening chamber 106 (Fig. 1) as a preferred initial step for cleaning. This material-softening chamber, in the present instance, comprises a substantially chimney-like structure which receives steam from the hot water bath within the hot water spray chamber 107. Spraying of the hook bars subsequent to the softening of the coating material thereon removes the coating material. For its sterilizing effect, the hook bars are finally given a steam bath by the steam jet 109.

Figure 19:
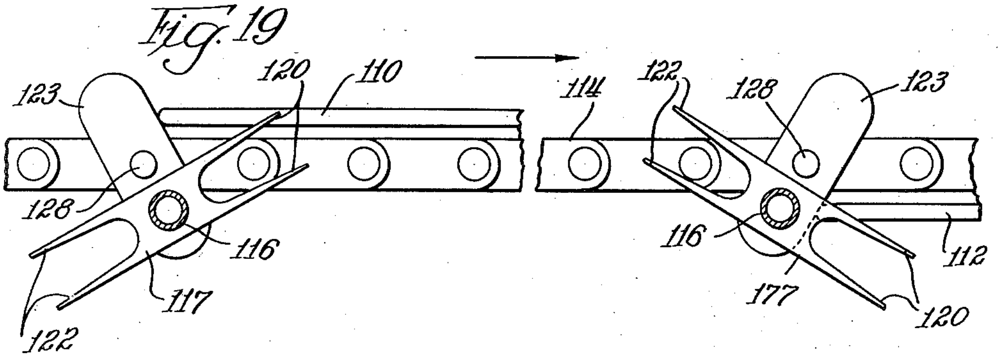

As shown in Fig. 19, the drying of the washed and sterilized hook bars is accomplished in our preferred apparatus and method by successive rotational movements of the hook bars relative to the conveyor chains. That is, the guide 110, which is disposed above the chain and in alignment for engagement with the hook bar guide plates 123, rotates the hook bars in one direction so that the moisture thereon is drained from the tips of the hook plate tangs 122. At the end of the guide 110, the hook bars swing back to their normal positions; after which engagement of the guide plates 123 with the guide 112 rotates the hook bars in the opposite direction to drain moisture from the tips of the hook plate tangs 120. After being thus dried, the hook bars are ready to be reloaded with base cakes by the loading apparatus so that the cycle of operation may continue without interruption.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. Apparatus for dip-coating base cakes in continuous cycles of operation in the production of cookies and the like and comprising, in combination, a driven endless conveyor having opposed carrying elements thereon for carrying the base cakes, said conveyor including drying sections wherein the path thereof is sinuous, loading apparatus for placing base cakes simultaneously upon the opposed carrying elements by moving the cakes in opposite directions toward one another, a dip pan adjacent the conveyor preceding each drying section thereof for holding a supply of dip-coating material at a position such that the base cakes on the carrying elements pass therethrough, and unloading apparatus for removing the dipped and dried base cakes from the carrying elements.

2. The method of mechanically dip-coating base cakes in the production of cookies or the like on an endless conveyor having oppositely projecting tangs for carrying the base cakes in opposed positions on two sides of the conveyor and comprising the steps of loading the base cakes onto opposite sides of the conveyor at substantially the same time, sequentially dip-coating the base cakes on the two sides of the conveyor, periodically inverting the dipped base cakes while the coating is acquiring an initial set so as to retain the coating material thereon and limit the formation of droplets, breaking bubbles in the coating materials, drying the coating, sequentially redipping the coated base cakes on the two sides of the conveyor, drying the second coating, and removing the dried cookies from the conveyor.

3. The method of mechanically dip-coating base cakes in the production of cookies or the like on an endless conveyor having oppositely projecting tangs for carrying the base cakes in opposed positions on two sides of the conveyor and comprising the steps of securing the base cakes to sides of the conveyor at substantially the same time, sequentially dip-coating the base cakes on the two sides of the conveyor, periodically inverting the dipped base cakes while the coating is acquiring an initial set so as to retain the coating material thereon and limit the formation of droplets, drying the coating, and removing the dried cookies from the conveyor.

4. The method of dip-coating relatively flat base cakes in the production of cookies and the like which includes the steps of moving the base cakes edgewise through the dip-coating uaterial, and successively inverting the base cakes so that opposite edges are uppermost to smooth the layer of dip-coating material applied thereto.

5. The method of dip-coating relatively flat base cakes in the production of cookies and the like as defined in claim 4, and which includes the additional step of breaking air bubbles in the coating material on the base cakes after dipping and prior to the completion of the successive inversions.

6. In apparatus for dip-coating base cakes in the production of cookies and the like on an endless conveyor, the combination comprising an endless conveyor having rows of projecting tangs in spaced relationship for carrying the base cakes, a drum supported for rotational movement with the axis thereof substantially parallel to said rows of projecting tangs, said drum having a peripheral surface disposed closely adjacent said conveyor along an axial line, said peripheral surface having rows of outwardly open pockets therein spaced to align with said projecting tangs and of a size for receiving and carrying said base cakes, said base cakes being transferred from the drum to the tangs along the line of their closely adjacent relationship by pressure forcing the tangs into the base cakes, and said drum providing backing surfaces for supporting and applying pressure to the base cakes while the tangs are forced into the base cakes.

7. In apparatus for dip-coating base cakes as defined in claim 6 wherein said tangs project in opposed relationship from opposite sides of the conveyor, and two like drums are disposed on opposite sides of the conveyor for applying base cakes to the tangs on both sides thereof.

8. In apparatus for dip-coating base cakes as defined in claim 6 wherein a series of hoppers is disposed along the upper portion of said drum in positions for alignment with the pockets of said rows as the drum is rotated, said hoppers having bottom openings through which base cakes gravitate from the hoppers to the pockets, and a movable slide for controlling the passage of base cakes to the pockets.

9. In apparatus for dip-coating base cakes as defined in claim 6 wherein said drum is supported by movable parts for movement toward and from said conveyor between operative and inoperative positions relative to said tangs.

10. In apparatus for dip-coating base cakes in the production of cookies and the like, the combination comprising an endless conveyor for carrying the base cakes in exposed positions, means for dip-coating the base cakes, and means for breaking air bubbles in the dipped coatings, the last mentioned means including resilient wire-like elements supported adjacent the conveyor in positions such that they engage and drag across exposed surfaces of the dipped base cakes in a direction substantially longitudinal of the wire.

11. Apparatus for dip-coating base cakes in the production of cookies and the like comprising, in combination, a driven endless conveyor including two substantially parallel and coextensive chains having hook bars carried thereby and therebetween, said hook bars each having tangs for carrying base cakes, loading apparatus for applying base cakes to the tangs of the hook bars to be carried thereby during movement of the conveyor, said loading apparatus including parts driven in synchronism with the conveyor for applying base cakes to the tangs as those tangs pass said parts, a dip pan adjacent a portion of the conveyor for holding a supply of dip-coating material through which the base cakes pass after being applied to the tangs on the hook bars, said conveyor including a drying section adjacent the dip pan, unloading apparatus for removing the dipped and dried base cakes from the hook bars, said hook bars being supported for normally free rotation between the conveyor chains, and stationary guides at spaced positions along the conveyor for engaging the hook bars to effect periodic inversion of the hook bars relative to the chains so as to retain the dip-coatings on the base cakes and limit the formation of droplets.

12. Apparatus for dip-coating base cakes in the production of cookies and the like as defined in claim 11 and wherein said loading apparatus and said unloading apparatus each embody manually operable control elements by which they may be selectively rendered effective without stopping the conveyor.

13. In apparatus for dip-coating base cakes in the production of cookies and the like on an endless conveyor including hook bars having series of tangs in opposed relationship on opposite sides of a cross bar for carrying base cakes, the combination comprising means for simultaneously pressing base cakes onto said series of opposed tangs on the opposite sides of each cross bar, means for separately dipping the base cakes on the opposite sides of each cross bar in coating material by movement of the cross bars in a direction lateral to the tangs, and the depth of said coating being between the base cakes and the cross bar in each instance.

14. In apparatus for dip-coating base cakes in the production of cookies and the like on an endless conveyor, the combination comprising an endless conveyor having rows of projecting tangs in spaced relationship for carrying the base cakes, a drum supported for rotational movement with the axis thereof substantially parallel to said rows of projecting tangs, said drum having a peripheral surface disposed closely adjacent said conveyor along in axial line, said peripheral surface having rows of outwardly open pockets therein spaced to align with said projecting tangs and of a size for receiving and carrying said base cakes, said base cakes being transferred from the drum to the tangs along the line of their closely adjacent relationship by pressure forcing the tangs into the base cakes, said drum providing backing surfaces for supporting and applying pressure to the base cakes while the tangs are forced into the base cakes, a series of hoppers supported at the upper portion of the drum in positions for alignment with said rows of outwardly open pockets as the drum is rotated, said hoppers having bottom openings through which base cakes gravitate from the hoppers to the pockets, a movable slide for controlling the passage of the base cakes to the pockets, means supporting both the drum and hoppers for movements as a unit toward and from the conveyor, manually operable means for effecting said movements of the drum and hoppers so as selectively to start and stop the loading of base cakes onto the conveyor without stopping the conveyor, and additional manually operable means for starting and stopping said movable slide.

15. In apparatus for dip-coating base cakes in the production of cookies and the like on an endless conveyor which includes a substantially vertical portion at which the cakes are applied thereto, the combination comprising a conveyor loading drum supported for rotational movement relative to a substantially horizontal axis, said drum having a peripheral surface which has therein separated peripheral rows of outwardly open pockets in spaced relationship in the rows and of a size for receiving and carrying said base cakes, said pockets having backing surfaces for applying pressure against the base cakes to effect their transfer to the conveyor, means for feeding base cakes into the pockets at the top of the drum, a piece of flexible fabric anchored at one end and draped downwardly over the drum between the last mentioned means and the side of the drum for retaining the base cakes in the pockets during rotation of the drum, and resilient fingers supported adjacent the side portion of the drum for retaining the base cakes in the pockets during a portion of the drum movement at the lower end of the fabric.

16. In apparatus for dip-coating base cakes in the production of cookies and the like on an endless conveyor which includes a substantially vertical portion at which the base cakes are applied thereto, the combination comprising a conveyor loading drum supported for rotational movement relative to a substantially horizontal axis, said drum having a peripheral surface which has therein separated peripheral rows of outwardly open pockets in spaced relationship in the rows and of a size for receiving and carrying said base cakes, said pockets having backing surfaces for applying pressure against the base cakes to effect their transfer to the conveyor, a series of hoppers mounted at the top of the drum in positions for alignment with the pockets of said rows as the drum is rotated, said hoppers having bottom openings through which base cakes gravitate from the hoppers to the pockets, and a pusher mechanism driven in synchronism and timed relationship with the drum movement for controlling said openings and pushing the base cakes into the drum pockets.

17. In apparatus for dip-coating base cakes and the like, the combination of a continuously driven conveyor including two parallel endless chains, a plurality of parallel hook bars having their opposite ends connected to the respective chains in spaced apart relation, each hook bar having a plurality of tangs spaced apart and extending outward on its opposite sides, loading means past which the bars travel including means for simultaneously impaling cakes on the opposite tangs of each bar by moving the cakes in opposite directions toward one another as the bar passes the loading means, and means for driving the conveyor and loading means in synchronism.

18. In apparatus for dip-coating base cakes and the like, the combination of a continuously driven conveyor including two parallel endless chains, a plurality of parallel hook bars having their opposite ends connected to the respective chains in spaced apart relation, each hook bar having a plurality of tangs spaced apart and extending outward on its opposite sides, means whereby the conveyor is driven vertically for a part of its run, means whereby the tangs extend horizontally outward on opposite sides of the bars during the vertical run of the conveyor, loading means past which the conveyor and bars travel during their vertical run, and means for impaling cakes simultaneously on the opposite tangs of each bar, as each bar passes the loading means.

19. Apparatus for dip-coating base cakes in continuous cycles of operation in the production of cookies and the like and comprising, in combination, a driven endless conveyor having opposed carrying elements thereon for carrying the base cakes, said conveyor including drying sections wherein the path thereof is sinuous, loading apparatus for mechanically placing base cakes simultaneously upon the opposed carrying elements, a dip pan adjacent the conveyor preceding each drying section thereof for holding a supply of dip-coating material at a position such that the base cakes on the carrying elements pass therethough, unloading apparatus for removing the dipped and dried base cakes from the carrying elements, and controls for separately rendering the loading apparatus and the unloading apparatus ineffective.

20. Apparatus for dip-coating base cakes in the production of cookies and the like comprising, in combination, a driven endless conveyor including two substantially parallel and coextensive chains having hook bars carried thereby and therebetween, said hook bars each having thereon rows of spaced and oppositely projecting tangs for carrying base cakes, loading apparatus for applying base cakes to the tangs of the hook bars to be carried thereby during movement of the conveyor, said loading apparatus including base cake feeding hoppers and opposed drums driven in synchronism with the conveyor and having rows of base cake carrying pockets therein for applying base cakes to both of the rows of oppositely projecting tangs as those tangs pass between the opposed drums, said pockets having base cake backing surfaces which pass adjacent the hook bars of the conveyor in opposed relationship thereto so as to press the base cakes onto opposed tangs of the hook bars, a dip pan adjacent a portion of the conveyor for holding a supply of dip-coating material through which the base cakes pass after being applied to the tangs on the hook bars, said conveyor including a drying section adjacent the dip pan, and unloading apparatus for removing the dipped and dried base cakes from the hook bars.

21. Apparatus for dip-coating base cakes in the production of cookies and the like comprising, in combination, a driven endless conveyor including two substantially parallel and coextensive chains having hook bars carried thereby and therebetween, said hook bars each having thereon rows of spaced and oppositely projecting tangs for carrying base cakes, loading apparatus for applying base cakes to the tangs of the hook bars to be carried thereby during movement of the conveyor, said loading apparatus including parts in opposed relationship and driven in synchronism with the conveyor for applying base cakes to both of the rows of oppositely projecting tangs as those tangs pass between the opposed parts, a dip pan adjacent a portion of the conveyor for holding a supply of dip-coating material through which the base cakes pass after being applied to the tangs on the hook bars, said conveyor including a drying section adjacent the dip pan, said hook bars being supported for rotational movement about an axis extending laterally of and between the conveyors so as normally to assume predetermined level positions therebetween, said conveyor chains passing around portions of axially aligned sprockets at said dip pan, and a guide for turning the hook bars from their predetermined level positions so that the base cakes pass edgewise through the dip pan.

NATHAN J. WATSON.
WILLIAM R. STEINGRABER.

REFERENCES CITED

The following references are of record in the file of this patent:

UNITED STATES PATENTS

| Number | Name | Date |
|---|---|---|
| 1,130,377 | Collis | Mar. 2, 1915 |
| 1,179,348 | Collis | Apr. 11, 1916 |
| 2,335,118 | Hauser et al. | Nov. 23, 1943 |
| 2,381,502 | Lang | Aug. 7, 1945 |